Jan. 24, 1928.
M. C. SCHWEINERT
1,657,042
DUST CAP FOR TIRE VALVES
Filed Aug. 3, 1918
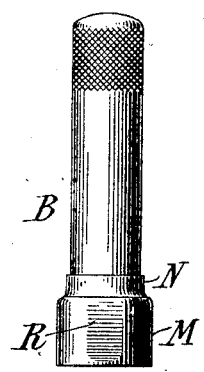
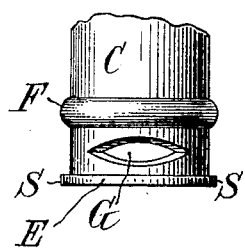
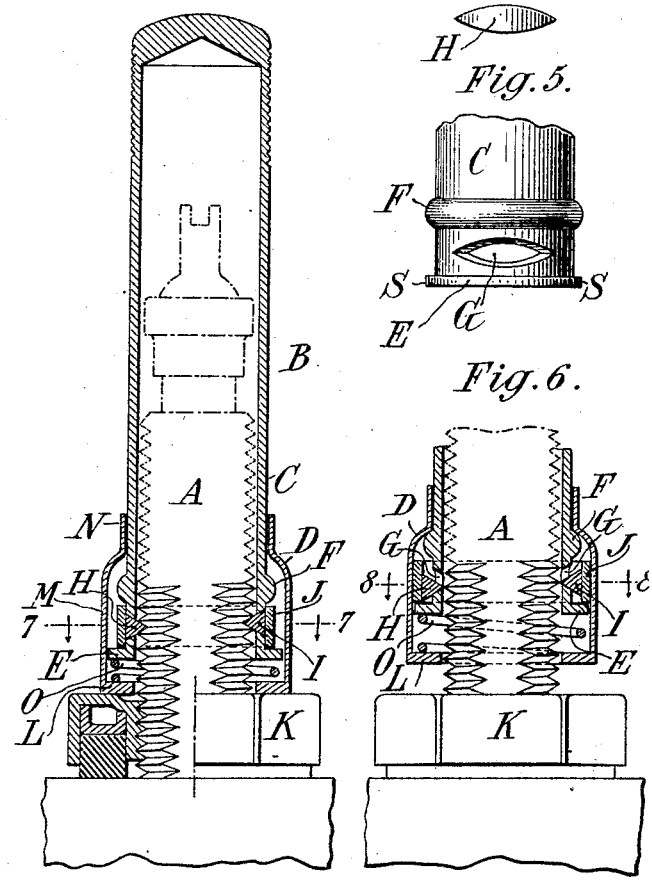
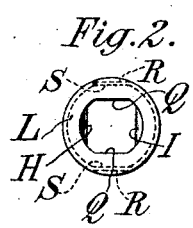
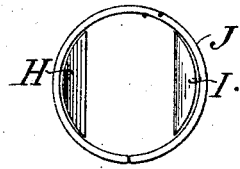
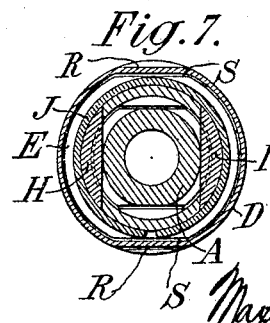
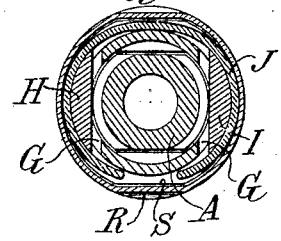
INVENTOR
Maximilian Charles Schweinert
By Attorneys,
Fraser, Dirk & Myers
WITNESS:
René Bruine Patented Jan. 24, 1928.

1,657,042

UNITED STATES PATENT OFFICE.

MAXIMILIAN CHARLES SCHWEINERT, OF WEST HOBOKEN, NEW JERSEY; CARL E. WHITNEY, MAY SCHWEINERT, AND THE FARMERS LOAN AND TRUST COMPANY EXECUTORS OF SAID MAXIMILIAN C. SCHWEINERT, DECEASED.

DUST CAP FOR TIRE VALVES.

Application filed August 3, 1918. Serial No. 248,092.

This invention relates to dust caps for tire valves and aims to provide certain improvements therein.

The present invention is to provide a cap which can be easily applied and removed from the tire valve casing and which can be held in place with sufficient security to prevent its becoming lost. To this end I have provided a cap which preferably carries catch members adapted to engage with the threads of the valve casing, such members being formed to slide along the threads in either direction, so that the cap is applied merely by forcing it down and removed by pulling it off. Preferably I provide a construction in which the cap is maintained frictionally on the valve casing by the circumferential contraction of a spring member which preferably acts through such catch members. In connection therewith, I prefer to use a resilient foot which contacts with the rim nut or wheel felloe so as to tighten the cap in place in case the threads of the valve casing are so located as to prevent the cap from making a tight connection alone.

Referring to the drawings, wherein I have illustrated one form of the invention:—

Figure 1 is a side elevation of the cap.
Fig. 2 is an underside view.
Fig. 3 is an enlarged diametrical section.
Fig. 4 is an elevation of one of the catch members.
Fig. 5 is an elevation of the lower side of the cap proper when the foot member is removed.
Fig. 6 is a view of the lower part of Fig. 3 with the parts in another position.
Fig. 7 is a cross-sectional view on the line 7—7 in Fig. 3.
Fig. 8 is a cross-sectional view on the line 8—8 in Fig. 6.
Fig. 9 is a plan of the catchers and thin spring, detached.

Referring to the drawings let A indicate a tire valve of the usual standard construction and B the dust cap as a whole. The dust cap B comprises a cap portion C and a foot portion D. The cap portion C may be formed of rod or of sheet metal drawn to cup shape. At the lower end of the cap portion is formed an outwardly extending flange E, while a short distance above it is a bead F. Between the bead and flange are cut one or more openings G, which in the construction shown are designed to admit the catch members H and I. An elevation of one of the catch members is shown in Fig. 4. Surrounding both catch members is a spring ring J whose function it is to press the catch members inwardly under spring tension.

The result of this construction is that the catch members are held yieldingly in their inward positions. If the cap is now pressed down over the valve stem or casing the catches will slide along the screw-threads of the stem until they engage the lowermost thread which they are capable of engaging in the particular position of the valve. The latter, however, may occupy any position with regard to the projection of its threaded portion beyond the rim nut K, for instance, or the wheel felloe. In some instances, therefore, when the catches have engaged the lowest possible thread, the bottom of the cap will not tightly engage the rim nut so that the cap is apt to be loose or wobbly. To avoid this condition, I preferably provide a resilient member at the foot of the cap proper, as shown at D. This member is illustrated as a sleeve having a lower flange L in a side wall M. Preferably the upper edge is reduced in diameter as shown at N to slidingly fit the cap portion C. The foot portion preferably thereby encloses the bead F, ring J and flange E. Between the flange E and the flange L, is located a resilient member such as a spring O which tends to push downwardly the foot portion until the restricted end of the foot portion engages the bead F. The result of this construction is that as the cap is pressed downwardly, the foot portion first strikes the rim nut or its equivalent and presses the spring whereupon the spring yields to permit a further downward movement of the cap C until the catches engage such a thread as will maintain the cap in a reasonably tight or rigid condition with reference to the valve stem.

In order to prevent the cap from turning, to thereby ensure that the catches H will always engage the screw-threads, the flange L of the portion D is formed with flats Q whereby the foot portion is prevented from turning by the flats on the valve casing. The upper sides of the foot portion, as shown at R, Fig. 1, are also flattened to engage the flats S formed on the flange E of the cap portion, as is seen in Fig. 7. Any other suitable way of accomplishing this result may be adopted.

While I have shown and described one form of the invention, it will be understood that I do not wish to be limited thereto, since various changes may be made therein without departing from the spirit of the invention.

What I claim is:—

1. A dust cap for tire valves or the like having catching means for entering between and engaging the threads of the tire valve, said means being yielding to permit the cap to be forced in either direction along the valve, and said cap having a yielding member at its foot adapted to permit the catching means to engage different threads.

2. A dust cap for tire valves or the like having oppositely arranged catch members for entering between and engaging the threads of the valve, said members being yielding to permit the cap to be forced in either direction along the valve, and said cap having a yielding member at its foot enclosing the catch members and adapted to permit the latter to engage different threads.

3. A dust cap for tire valves or the like having separately formed spring-held catch members for engaging the threads of the valve and said cap having a yielding member at its foot adapted to permit the catch members to engage different threads.

4. A dust cap for tire valves or the like comprising a cup portion having spring catches adapted to move along the threads of the tire valve in either direction and a yielding foot member enclosing such catches.

5. A dust cap for tire valves or the like comprising a cap portion having spring catches adapted to move along the threads of the tire valve in either direction and a yielding foot member enclosing such catches, said foot member comprising a cup-shaped portion and a spring arranged between such cup-shaped portion and the cap portion.

6. A dust cap for tire valves or the like, comprising a cap portion having a shoulder, non-compressible spring means seated on said shoulder and free to expand and contract thereon, said spring means having parts thereof extending inwardly beyond the inner wall of the cap portion to such extent as to be engageable by the threads of a tire valve over which the dust cap is adapted to be forced in either direction, during which action the spring means will yieldingly ride over the threads while in engagement therewith, said spring means being movable outwardly with respect to the wall of the cap, but only by the tire valve when the dust cap is being applied thereover or removed therefrom.

In witness whereof, I have hereunto signed my name.

MAXIMILIAN CHARLES SCHWEINERT.